United States Patent

Yamamoto et al.

(10) Patent No.: US 7,184,119 B2
(45) Date of Patent: Feb. 27, 2007

(54) LIQUID CRYSTAL DEVICE AND ITS MANUFACTURING METHOD

(75) Inventors: Kenji Yamamoto, Kanagawa (JP); Koichiro Kishima, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/501,229

(22) PCT Filed: Dec. 4, 2003

(86) PCT No.: PCT/JP03/15532

§ 371 (c)(1),
(2), (4) Date: Jul. 12, 2004

(87) PCT Pub. No.: WO2004/053578

PCT Pub. Date: Jun. 24, 2004

(65) Prior Publication Data

US 2005/0122461 A1 Jun. 9, 2005

(30) Foreign Application Priority Data

Dec. 12, 2002 (JP) ............................ P2002-360490

(51) Int. Cl.
*G02F 1/13* (2006.01)
(52) U.S. Cl. ....................... 349/200; 349/201
(58) Field of Classification Search ............... 349/200, 349/201, 160
See application file for complete search history.

(56) References Cited

U.S. PATENT DOCUMENTS 4,850,681 A * 7/1989 Yamanobe et al. ......... 349/201

5,148,302 A * 9/1992 Nagano et al. ............. 349/201

(Continued)

FOREIGN PATENT DOCUMENTS

EP 0 537 904 A2 4/1993

(Continued)

OTHER PUBLICATIONS

International Search Report dated Feb. 3, 2004.

(Continued)

*Primary Examiner*—James A. Dudek
(74) *Attorney, Agent, or Firm*—Rader Fishman & Grauer PLLC; Ronald P. Kananen

(57) ABSTRACT

A liquid crystal device capable of giving a phase distribution to transmitted light without the need for complicated calculations, thereby making it possible to easily perform manufacturing of liquid crystal devices and device evaluations thereof. A liquid crystal layer (120) sealed between glass substrates (100) and (110) has a given thickness distribution owing to the unevenness of a sub-substrate (111) provided inwardly of the glass substrate (110). Electrodes (130) and (140) disposed on the opposite sides of this liquid crystal layer (120) have planar shapes and are disposed in parallel. Accordingly, the distance between the two electrodes (130) and (140) is constantly uniform, and an electric field distribution applied to the liquid crystal layer (120) is uniform. Accordingly, the shape of a phase distribution to be given to the transmitted light through the liquid crystal is determined by only the thickness distribution of the liquid crystal layer, and the magnitude is determined by an applied voltage value to be applied to the electrodes. Accordingly, by making the electric field distribution applied to the liquid crystal layer uniform, it is possible to easily and accurately calculate the phase distribution of the transmitted light, by using the thickness distribution of the liquid crystal layer.

10 Claims, 6 Drawing Sheets

U.S. PATENT DOCUMENTS 5,416,757 A * 5/1995 Luecke et al. ........... 369/44.23
5,936,923 A 8/1999 Ootaki et al.

FOREIGN PATENT DOCUMENTS

| JP | 4-250418 A | 9/1992 |
| JP | 7-134269 A | 5/1995 |
| JP | 2000-132854 | 5/2000 |
| JP | 2001-179245 | 7/2001 |
| JP | 2002-251774 A | 9/2002 |

OTHER PUBLICATIONS

European Search Report, Application No./Patent No. 03777245.6-2210 PCT/JP0315532, dated Nov. 7, 2006.

* cited by examiner

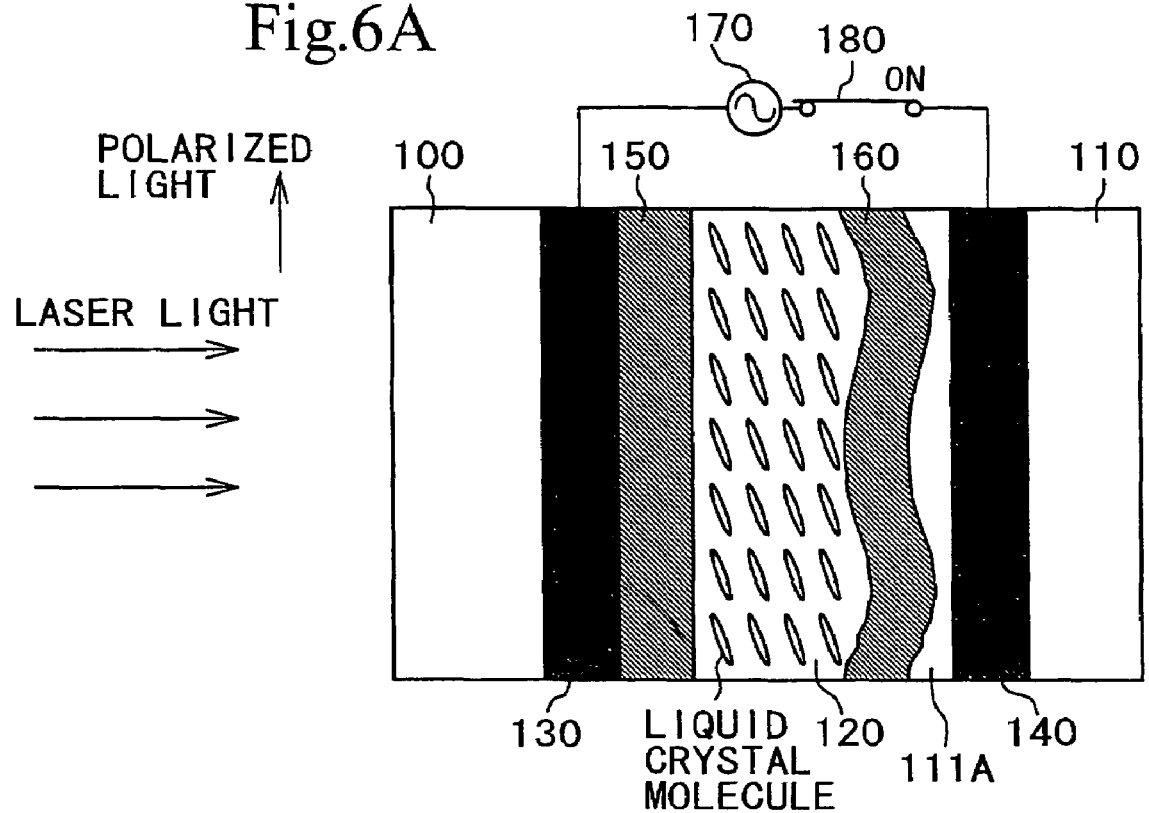
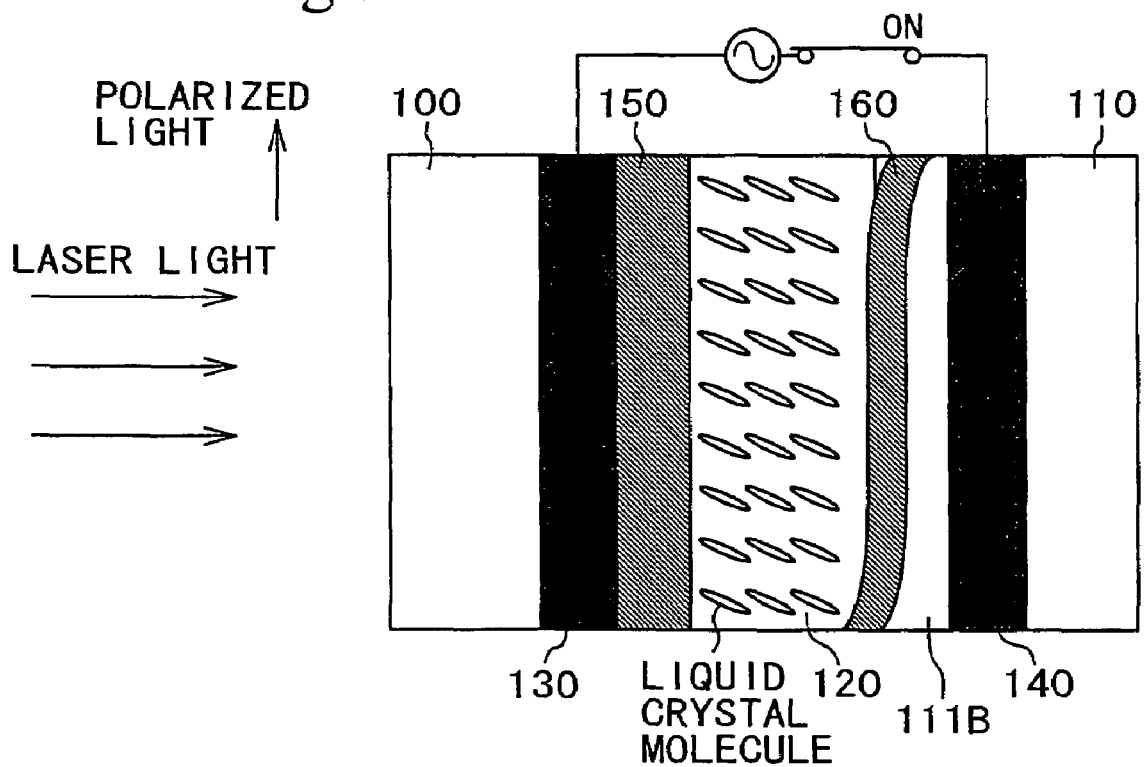

LIQUID CRYSTAL DEVICE AND ITS MANUFACTURING METHOD

TECHNICAL FIELD

The present invention relates to a liquid crystal device which can be used in an optical recording/reproducing apparatus, such as an optical disc system, a magneto-optical disc system or an optical card system, and a manufacturing method for the liquid crystal device.

BACKGROUND ART

In recent years, in order to increase the information recording capacities of optical discs, blue semiconductor lasers (LDs) having light sources with shorter wavelengths are used. Objective lenses having high numerical apertures (NAs) also are employed. Furthermore, in systems employing those, techniques which apply two-layer discs are being put to practical use.

However, in an optical disc system using these, owing to a perturbation such as a tilt error of a disc from an optical axis of an optical pickup, a cover thickness error, or an interlayer aberration of a two-layer disc, the quality of a beam which reproduces signals is easily degraded, so that it becomes difficult to maintain good signal recording/reproduction characteristics.

As a related art which prevents such signal quality degradation, for example, it has been proposed to insert a compensation optical system in an optical path of a light beam irradiated onto an optical disc, in order to reduce coma aberration caused by a tilt error of the above mentioned disc (Japanese Patent Application Publication No. 2000-132854).

However, the above related art does not take enough account of various perturbations other than the tilt error of the disc, such as a cover thickness error and an interlayer aberration of a two-layer disc.

For this reason, to cope with the various perturbations mentioned above, the present applicant has proposed a method of improving the quality of a beam by controlling the phase distribution of a transmitting wavefront of the beam by the use of a liquid crystal device inserted in an optical path (Japanese Patent Application No. 2001-179245; hereinafter referred to as the prior application).

Namely, in the prior application, the phase distribution of the transmitting wavefront of the beam is controlled by means of two parameters, a thickness of a liquid crystal layer and an applied voltage. Specifically, the thickness distribution of the liquid crystal layer determines the shape of the phase distribution, while the value of the applied voltage determines an absolute amount of the phase.

However, in this prior application, there is a problem that since electrodes are formed along the shape of the liquid crystal layer, the thickness distribution of the liquid crystal layer actually does not accurately reflect the phase distribution given to the wavefront of transmitted light.

Namely, in a case where the electrodes are formed along the shape of the liquid crystal layer, in a small-thickness portion of the liquid crystal layer, since the distance between the electrodes which sandwich the liquid crystal layer therebetween is small, electric field strength becomes strong when a voltage is applied across the electrodes. Conversely, in a large-thickness portion of the liquid crystal layer, since a distance between the electrodes is large, the electric field strength becomes weak.

The phase amount that the liquid crystal layer gives to the transmitting wavefront depends on not only the thickness of the liquid crystal layer but also on this electric field strength.

Accordingly, in a case where a distribution occurs in the electric field strength in the liquid crystal layer, as parameters of the phase distribution of light being passing through the liquid crystal, it is necessary to take account of not only (1) the thickness of the liquid crystal layer and (2) the value of the applied voltage, both of which have been pointed out in the prior application, but also (3) electric field strength distribution.

However, since the electric field strength depends on the shape of the liquid crystal layer, as mentioned above, the shape of the liquid crystal layer also must be optimized to a further extent in order to control the phase amount of the transmitting wavefront to a desired value.

As mentioned above, in the prior application, in the construction in which the electrodes are formed along the shape of the liquid crystal layer, the shape of the liquid crystal layer does not accurately reflect the phase distribution given to the transmitted light, and if an accurate phase distribution is to be reflected, the electric field strength distribution also must be taken into account.

For this reason, in order to give a desired phase distribution to the transmitted light, the shape of the liquid crystal layer must be optimized to take the electric field strength distribution into account. Namely, there is a need for extremely complicated calculations from a calculation of the electric field strength distribution determined by the voltage value to be applied and the shape of the liquid crystal layer to a calculation of the phase distribution to be given to the transmitted light, and there is a problem that manufacturing of the device and device evaluations are difficult.

Thus, an object of the present invention is to provide a liquid crystal device which can give a desired phase distribution to transmitted light, without the need for complicated calculations, and which can also be easily manufactured and subjected to device evaluations, and to provide a manufacturing method for the liquid crystal device.

DISCLOSURE OF THE INVENTION

To achieve the above object, the present invention is characterized by having a liquid crystal layer which controls a phase distribution of transmitted light, a pair of substrates which sandwich and seal the liquid crystal layer therebetween, and a pair of electrodes which are respectively disposed on insides of the substrates to apply a predetermined voltage to the liquid crystal layer, and is characterized in that an uneven portion for giving a distribution to a thickness of the liquid crystal layer is provided inwardly of the substrates, and the pair of electrodes is formed in planar shapes parallel to each other.

In addition, the present invention is characterized by having an objective lens disposed to face a recording medium, a laser light source which supplies laser light to the objective lens, and a liquid crystal device which is disposed in an optical path leading from the laser light source to the objective lens and controls a phase distribution of transmitted light, and is characterized in that the liquid crystal device has a liquid crystal layer which controls the phase distribution of the transmitted light, a pair of substrates which sandwich and seal the liquid crystal layer therebetween, and a pair of electrodes which are respectively disposed on insides of the substrates to apply a predetermined voltage to the liquid crystal layer, an uneven portion for giving a distribution to a thickness of the liquid crystal layer is provided inwardly of the substrates, and the pair of electrodes are formed in planar shapes parallel to each other.

In addition, the present invention provides a manufacturing method for a liquid crystal device which includes a liquid crystal layer which controls a phase distribution of transmitted light, a pair of substrates which sandwich and seal the liquid crystal layer therebetween, and a pair of electrodes which are respectively disposed on insides of the substrates to apply a predetermined voltage to the liquid crystal layer, and is characterized by including a step of providing an uneven portion for giving a distribution to a thickness of the liquid crystal layer inwardly of the substrates, and a step of forming the pair of electrodes into planar shapes parallel to each other.

In the liquid crystal device and the manufacturing method therefor according to the present invention, the uneven portion for giving a distribution to the thickness of the liquid crystal layer is provided on an inside surface of the substrates which sandwich the liquid crystal layer therebetween, and the electrodes which apply the predetermined voltage to the liquid crystal layer are formed in the planar shapes and are disposed in parallel with each other, whereby the electric field strength distribution becomes uniform and the thickness distribution of the liquid crystal layer can be accurately reflected in a phase distribution to be given to the wavefront of the transmitted light.

Accordingly, it is possible to give the desired phase distribution to the transmitted light, without the need for complicated calculations, so that it is possible to easily perform manufacturing of liquid crystal devices and device evaluations thereof.

In addition, it is possible to optimally control the transmitted light by disposing a similar liquid crystal device in the optical path of an optical pickup, and the liquid crystal device can be easily optimized to correct various aberrations without the need for complicated calculations, whereby it is possible to greatly promote characteristic improvement of optical pickups and facilitation of manufacturing thereof.

In addition, the present invention is characterized by having an objective lens disposed to face a recording medium, a laser light source which supplies laser light to the objective lens, and a liquid crystal device which is disposed in an optical path leading from the laser light source to the objective lens and controls a phase distribution of transmitted light, and is characterized in that the above-mentioned liquid crystal device has a liquid crystal layer which controls the phase distribution of the transmitted light, a pair of substrates which sandwich and seal the liquid crystal layer therebetween, and a pair of electrodes which are respectively disposed on insides of the substrates to apply a predetermined voltage to the liquid crystal layer, an uneven portion for giving a distribution to a thickness of the liquid crystal layer is provided inwardly of the substrates, and further, the pair of electrodes are formed in planar shapes parallel to each other.

BRIEF DESCRIPTION OF DRAWINGS

FIGS. 6A and 6B are cross-sectional views showing construction examples of liquid crystal layers having uneven portions respectively corresponding to the spherical aberration and the coma aberration shown in FIGS. 5A and 5B.

BEST MODE FOR CARRYING OUT THE INVENTION

Figure 1:
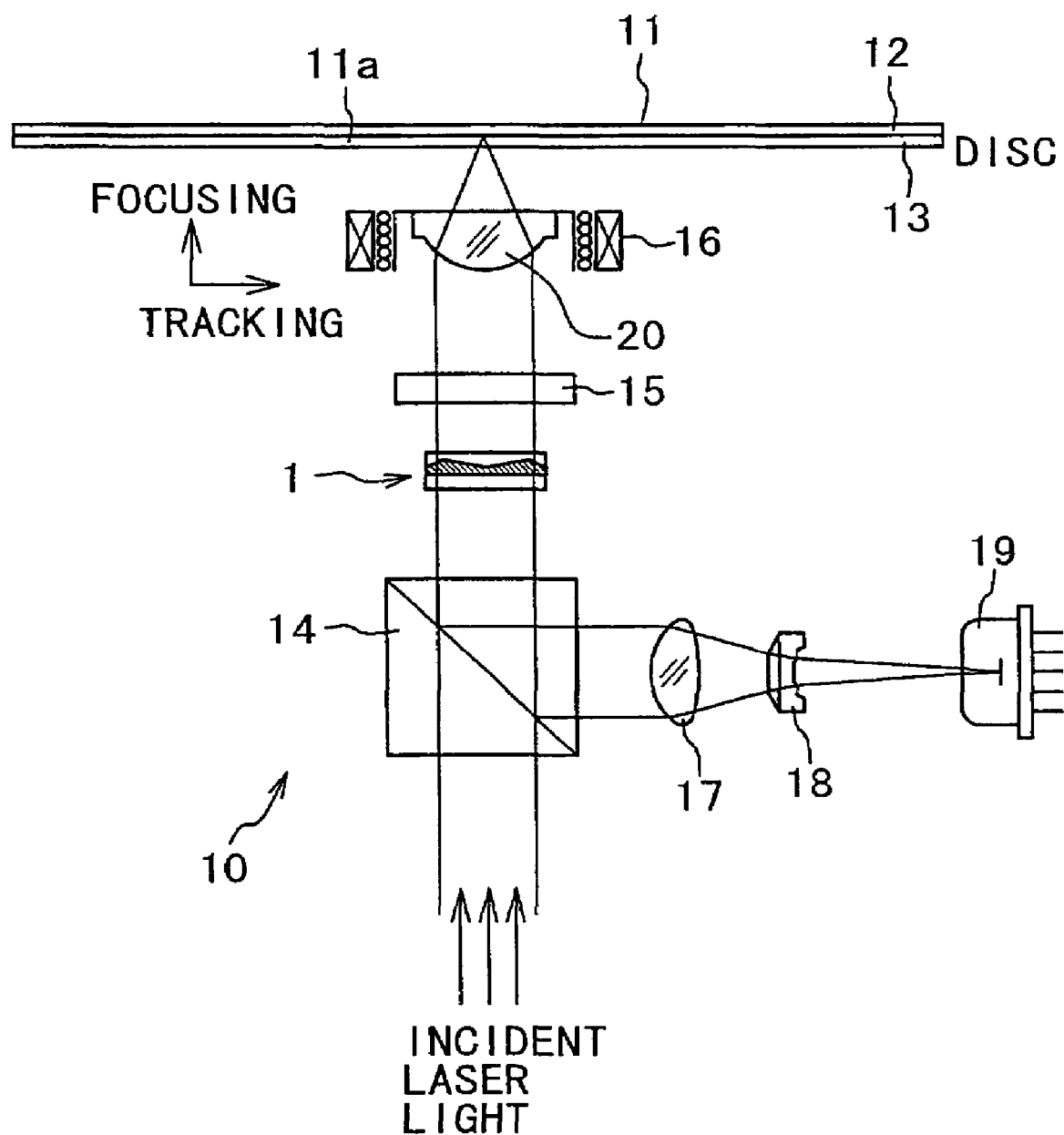
FIG. 1 is an explanatory view showing an entire construction example of an optical pickup according to an embodiment of the present invention.

Embodiments of a liquid crystal device and a manufacturing method therefor according to the present invention will be described below.

In view of the fact that the reason why a distribution occurs in electric field strength in the above-mentioned prior application is that electrode films are formed along the shape of a liquid crystal layer, in a liquid crystal device according to an embodiment of the present invention, this construction is eliminated, and two electrode films are formed into planar shapes and are disposed in parallel with each other, and they are respectively disposed in the insides of two substrates which sandwich the liquid crystal layer therebetween.

The portions between the liquid crystal layer and the electrodes are constructed to be filled with dielectrics, and the surface shapes of the two dielectric layers which sandwich the liquid crystal layer therebetween inside the two planar electrodes are formed in uneven shapes which allow the thickness distribution of the liquid crystal layer to have a shape similar to a desired phase distribution. Otherwise, for the sake of simplicity, the shape of a dielectric layer located on one side is formed in an uneven shape similar to the desired phase distribution to be given to transmitted light, and the other side is formed in a planar shape.

In a manufacturing method according to an embodiment of the present invention, a method of collectively molding an ultraviolet-curable resin by the use of a mold and a forming method based on a patterning process using a photomask are used as a method of forming the thickness distribution of the liquid crystal layer into a shape similar to the desired phase distribution, whereby a cost reduction is realized.

In the liquid crystal device formed in this manner, although the liquid crystal layer has a thickness distribution, the two electrodes located inside the substrates which sandwich the liquid crystal layer are formed in planar shapes and are parallel to each other, whereby the distance between the two electrodes is constantly uniform and the electric field distribution applied to the liquid crystal layer is uniform.

Accordingly, the shape of a phase distribution to be undergone by transmitted light through the liquid crystal is determined by only the thickness distribution of the liquid crystal layer, and the magnitude is determined by an applied voltage value to be applied to the electrodes. Namely, the thickness distribution of the liquid crystal layer becomes completely similar to the desired phase distribution. Accordingly, by making the electric field distribution applied to the liquid crystal layer uniform, it is possible to easily and accurately calculate the phase distribution of the transmitted light by using the thickness distribution of the liquid crystal layer, without the need for the parameter of electric field distribution.

Specific embodiments of the present invention will be described below in detail with reference to the accompanying drawings.

FIG. 1 is an explanatory view showing the entire construction of an optical pickup (an optical head 10) according to an embodiment of the present invention.

As shown, the optical head 10 of the present embodiment performs recording and reproduction onto and from a phase-change optical disc 11, and it has a liquid crystal device 1 which gives a desired phase distribution to light being transmitted through it, a polarization beam splitter (PBS) 14 which separates incident light and return light, a quarter wavelength plate 15 which changes the phases of the incident light and the return light by ¼ wavelength, a two-axis actuator 16 which controls an objective lens 20 in a focusing direction and a tracking direction, a photodetector 19 which performs detection of the return light, and a focusing lens 17 and a multilens 18 which make the return light incident on the photodetector 19.

In the phase-change optical disc 11, a protective film 13 is provided on a signal surface 11a provided on a disk substrate 12 and based on a phase change mode.

In the above-mentioned optical head 10, light from a laser light source, which is not shown, is collimated by a collimator lens, which is not shown, and is converted into a plane wave. Then, this laser light is refracted by the objective lens 20 and focused onto the signal surface 11a of the optical disc 11. Light reflected from the signal surface 11a of the optical disc 11 is reflected by the polarization beam splitter 14, and a signal is detected by the photodetector 19.

In this construction, if there is a perturbation such as a tilt of the optical disc 11 with regard to the optical axis of the optical pickup, a cover thickness error, or an interlayer aberration in a case of a two-layer disc, the quality of a beam which reproduces signals is easily degraded, so that it becomes difficult to maintain good signal recording/reproduction characteristics. Accordingly, the liquid crystal device 1 is disposed midway in an optical path as shown to correct aberrations occurring in the optical system.

Next, a structure and an aberration correcting operation relative to this liquid crystal device 1 will be described.

Figure 2A:
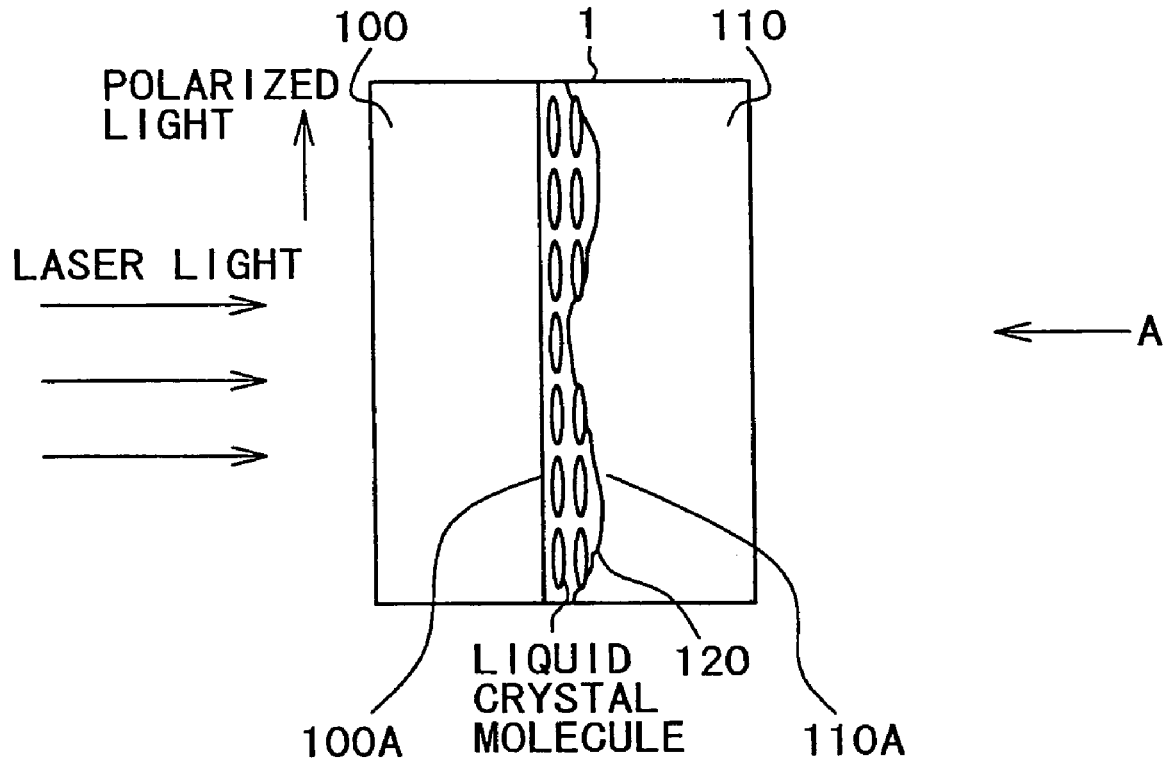
FIGS. 2A and 2B are respectively a cross-sectional view and a front view showing an outline of a liquid crystal device provided in the optical pickup shown in FIG. 1.
Figure 2B:
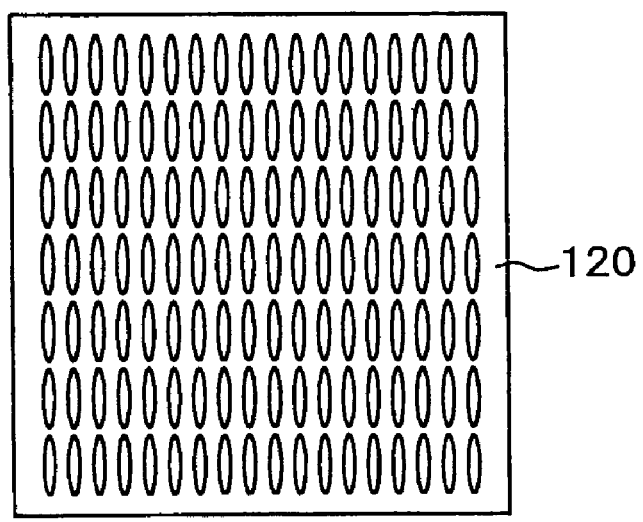

FIG. 2A is a cross-sectional view showing an outline of the liquid crystal device in the embodiment of the present invention, and FIG. 2B is a front view schematically showing a molecular arrangement of a liquid crystal layer (a view seen in a direction of an arrow A).

This liquid crystal device 1 has liquid crystal molecules (a liquid crystal layer) 120 sandwiched between two (a pair of) glass substrates 100 and 110, and a shape similar to a phase distribution desired to be given to transmitted light is formed on the surfaces (inside surfaces) of the respective substrates 100 and 110 that sandwich the liquid crystal layer 120 therebetween. Namely, an inside surface 100A of the glass substrate 100 is formed in a planar shape, while an inside surface 110A of the glass substrate 110 is formed in an uneven shape.

Figure 3A:
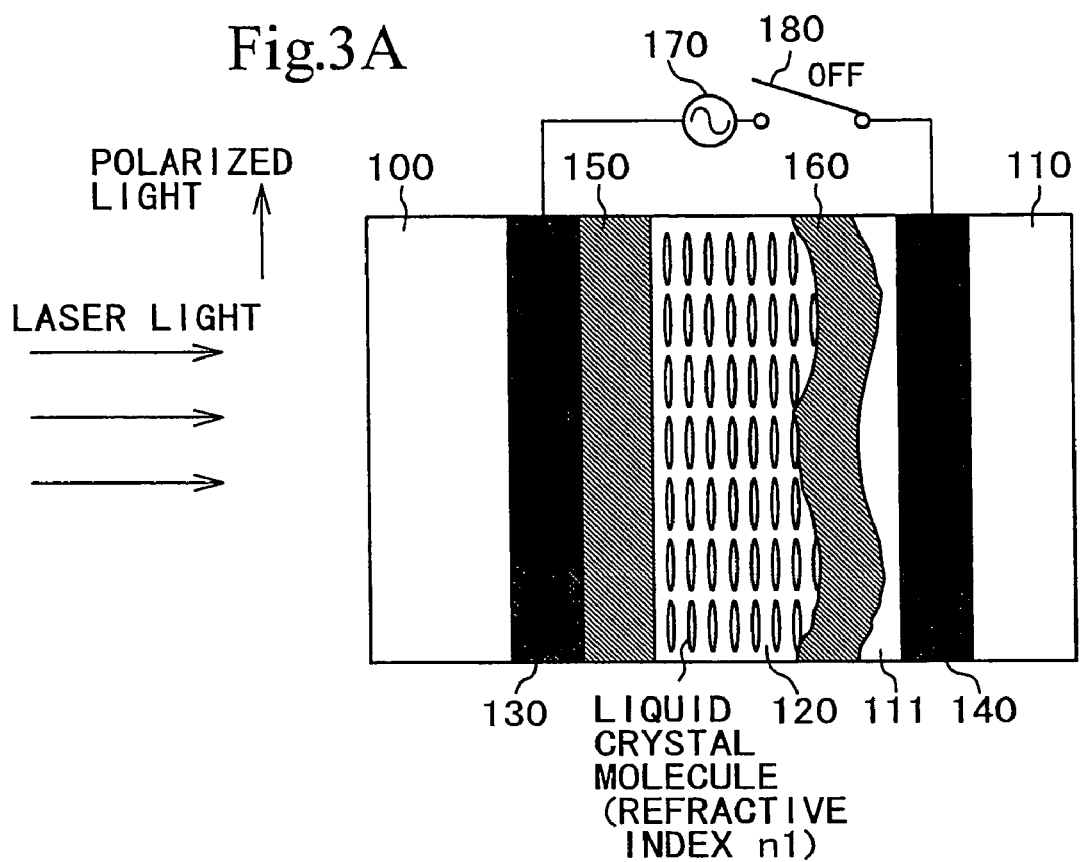
FIGS. 3A and 3B are cross-sectional views showing a specific construction example of the liquid crystal device shown in FIGS. 2A and 2B.
Figure 3B:
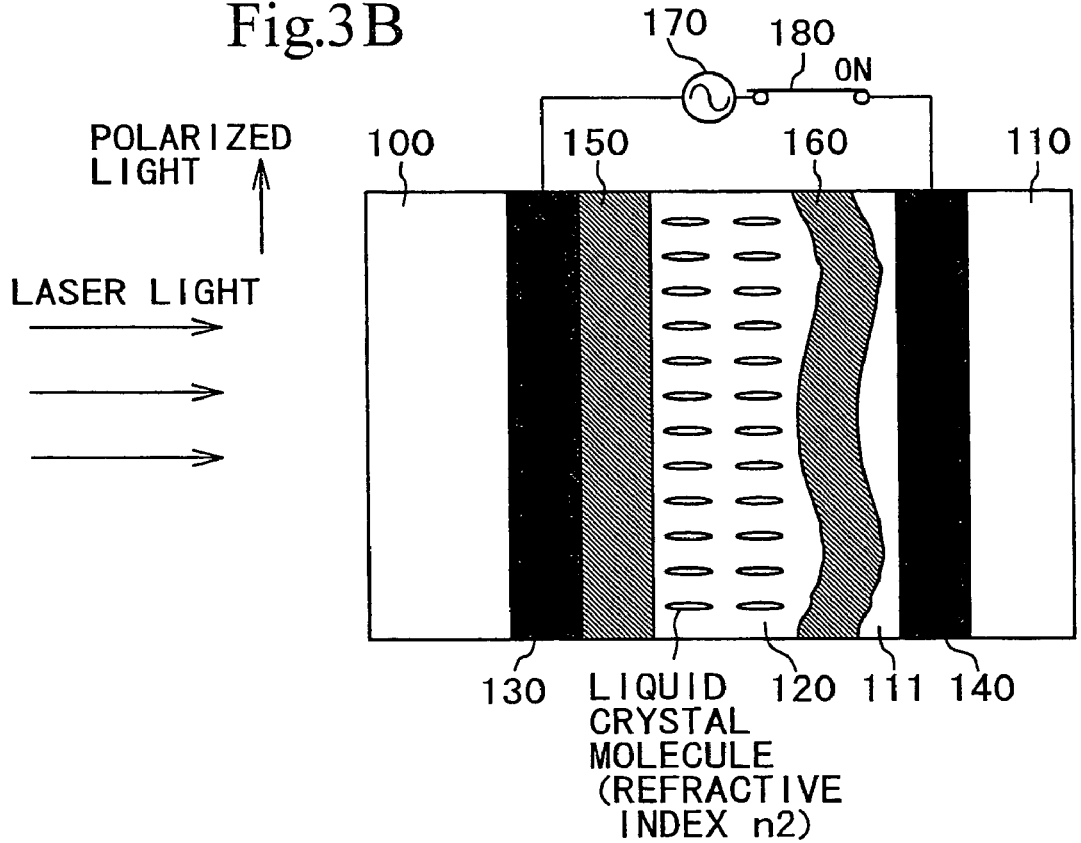

FIGS. 3A and 3B are cross-sectional views each showing a specific construction example of the liquid crystal device shown in FIGS. 2A and 2B, respectively.

As shown, two (a pair of) electrodes 130 and 140 which apply a voltage across the liquid crystal layer 120 are disposed respectively on the insides of the glass substrates 100 and 110, and alignment films 150 and 160 for imparting orientation to the liquid crystal layer 120 are formed respectively further inwardly of the electrodes 130 and 140.

As shown, the electrodes 130 and 140 are each formed in a planar shape and are arranged in parallel with each other. A voltage source 170 is connected to each of the electrodes 130 and 140, and its applied voltage is turned on and off by a switch 180.

Namely, the electrode 130 having a planar shape is provided on the inside surface 100A of the glass substrate 100, and the alignment film 150 is provided further inwardly of the inside surface 100A. On the other hand, the electrode 140 having a planar shape is provided on the inside of the glass substrate 110, a sub-substrate (an uneven portion) 111 for obtaining the inside surface 110A having an uneven shape is provided further inwardly of the electrode 140, and the inside surface of the sub-substrate 111 is formed in an uneven shape having a shape similar to the desired phase distribution. The alignment film 160 is formed on the inside of the sub-substrate 111. This alignment film 160 is provided in a curved shape which corresponds to a curved shape corresponding to the uneven shape of the inside surface 110A based on the sub-substrate 111.

According to this construction, the liquid crystal layer 120 is disposed in a state having a thickness distribution corresponding to the uneven shape of the inside surface 110A based on the sub-substrate 111.

The liquid crystal molecules are arranged along the alignment films 150 and 160 disposed inwardly of the respective glass substrates 100 and 110 which sandwich the liquid crystal layer 120 therebetween. In a case where no voltage is being applied to the liquid crystal molecules, the liquid crystal molecules lie down with respect to the glass substrates 100 and 110, as shown in FIG. 3A, and in a case where a voltage is applied, the liquid crystal molecules stand in directions perpendicular to the glass substrates 100 and 110, as shown in FIG. 3B. The liquid crystal layer 120 differs in refractive index between a case where the polarizing direction of incident light lies in a longer-axis direction of the liquid crystal molecules and a case where the polarizing direction of incident light lies in a shorter-axis direction of the liquid crystal molecules.

In addition, since the two electrodes 130 and 140 are planar and parallel to each other, the electric field strength applied to the liquid crystal layer 120 is uniform.

Accordingly, the refractive index of the liquid crystal layer 120 is the same in nearly all areas thereof, and in a case of the liquid crystal molecules lying down, the refractive index is n1; but in a case of the liquid crystal molecules standing, the refractive index becomes n2. During a state intermediate between both, the refractive index becomes intermediate between n1 and n2. Incidentally, in the above-mentioned prior application, since the electrodes are formed along the shape of the liquid crystal layer, a distribution occurs in the electric field strength, and the refractive index of the liquid crystal layer is not uniform and becomes more complicated.

In addition, in the liquid crystal device of the present embodiment, the sub-substrate 111 which constitutes part of the glass substrate 110 and has the uneven shape is disposed to fill between the liquid crystal layer 120 and the planar electrode 140 located on one side. The uneven shape of this sub-substrate 111 determines the shape, i.e., thickness distribution, of the liquid crystal layer 120.

In the present embodiment, although this sub-substrate 111 exists only between the electrode 140 located on the one side and the liquid crystal layer 120, this is because it is possible to achieve a constructional simplification which enables omission of an uneven shape and allows a planar shape to be provided between the electrode 130 located on the other side and the liquid crystal layer 120. However, dielectric layers also may be provided on both sides so that uneven shapes can be obtained on both sides.

Next, a method of manufacturing the sub-substrate 111 with the uneven shape that is disposed between the liquid crystal layer 120 and the planar electrode 140 will be described.

First, a method of fabricating the sub-substrate 111 from a molded material using an ultraviolet-curable resin will be described as a first manufacturing method.

This method uses the principle that the shape of a resin in a liquid state follows a mold, as well as the characteristic that the resin is cured by being irradiated with ultraviolet rays. In the method, this ultraviolet-curable resin, which is in the liquid state before irradiation with ultraviolet rays, is shaped by a mold having a shape corresponding to a shape for forming the thickness distribution of the above-mentioned liquid crystal layer 120 into a shape similar to a desired phase distribution, and after that, ultraviolet rays are irradiated to obtain a shape which follows the mold.

More specifically, first, an ultraviolet-curable resin is uniformly coated by a spin coating method or the like onto a substrate on which an electrode material for applying a voltage to a liquid crystal material is formed.

Then, a mold having a shape corresponding to a shape for forming the thickness distribution of the liquid crystal layer 120 into a shape similar to a desired phase distribution is pressed in contact with the ultraviolet-curable resin. Then, the resin material is brought into a solid state by being irradiated with ultraviolet rays while it is being deformed, and a sub-substrate corresponding to the shape for forming the thickness distribution of the liquid crystal layer into the shape similar to the desired phase distribution is formed on the substrate.

This method can be performed before a substrate dividing step that corresponds to individual liquid crystal devices by using a mold having a size corresponding to the wafer size with which substrates are to be formed. Accordingly, this method is a manufacturing method which is capable of fabricating at the same time a large number of uneven portions corresponding to a plurality of liquid crystal devices and is advantageous in cost reduction.

Next, a method of fabricating the sub-substrate 111 by a deposition process based on patterning using a photomask will be described as a second manufacturing method.

This method can use any of the following three methods.

(1) After a dielectric material (for example, $Ta_2O_5$, or a mixture of $Ta_2O_5$ and $SiO_2$) formed to a predetermined thickness or more has been formed on an electrode film by thin film deposition means such as sputtering, a photosensitive material that can be developed or stripped at a later time (hereinafter referred to as a photoresist material) is patterned into a shape corresponding to a photomask (an exposure step and a development step), and the dielectric material, such as $Ta_2O_5$ or a mixture of $Ta_2O_5$ and $SiO_2$, is etched by a technique, such as RIE (Reactive Ion Etching), by using the photoresist material as a mask material, thereby forming steps (a so-called etching method). By repeating this method a plurality of times, it is possible to obtain apparently smooth steps.

(2) After a dielectric material (for example, $Ta_2O_5$, or a mixture of $Ta_2O_5$ and $SiO_2$) has been formed by thin film deposition means, such as sputtering, on a substrate on which a photoresist material patterned into a shape corresponding to a photomask is formed on an electrode film, a pattern of the dielectric material is obtained by stripping the photoresist material (a so-called lift-off method). By repeating this method a plurality of times, it is possible to obtain apparently smooth steps.

(3) After a dielectric material (for example, $Ta_2O_5$, or a mixture of $Ta_2O_5$ and $SiO_2$) formed to a predetermined thickness or more has been formed on an electrode film by thin film deposition means, such as sputtering, a pattern which has apparently smooth steps and is made of a photoresist material is formed by using a photomask having a gray scale, and the dielectric material, such as $Ta_2O_5$ or a mixture of $Ta_2O_5$ and $SiO_2$, is etched by a technique, such as RIE (Reactive Ion Etching), by using the photoresist material as a mask material, thereby obtaining apparently smooth steps in a single exposure step.

It is to be noted that the above-mentioned manufacturing method using a photomask can be performed before the substrate dividing step which corresponds to individual liquid crystal devices by using a photomask having a size corresponding to the wafer size of a dielectric substrate. Accordingly, this method is a manufacturing method which is capable of fabricating at the same time a large number of uneven portions corresponding to a plurality of liquid crystal devices and is advantageous in cost reduction.

Next, aberration correction principles based on the liquid crystal device will be described.

Figure 4A:
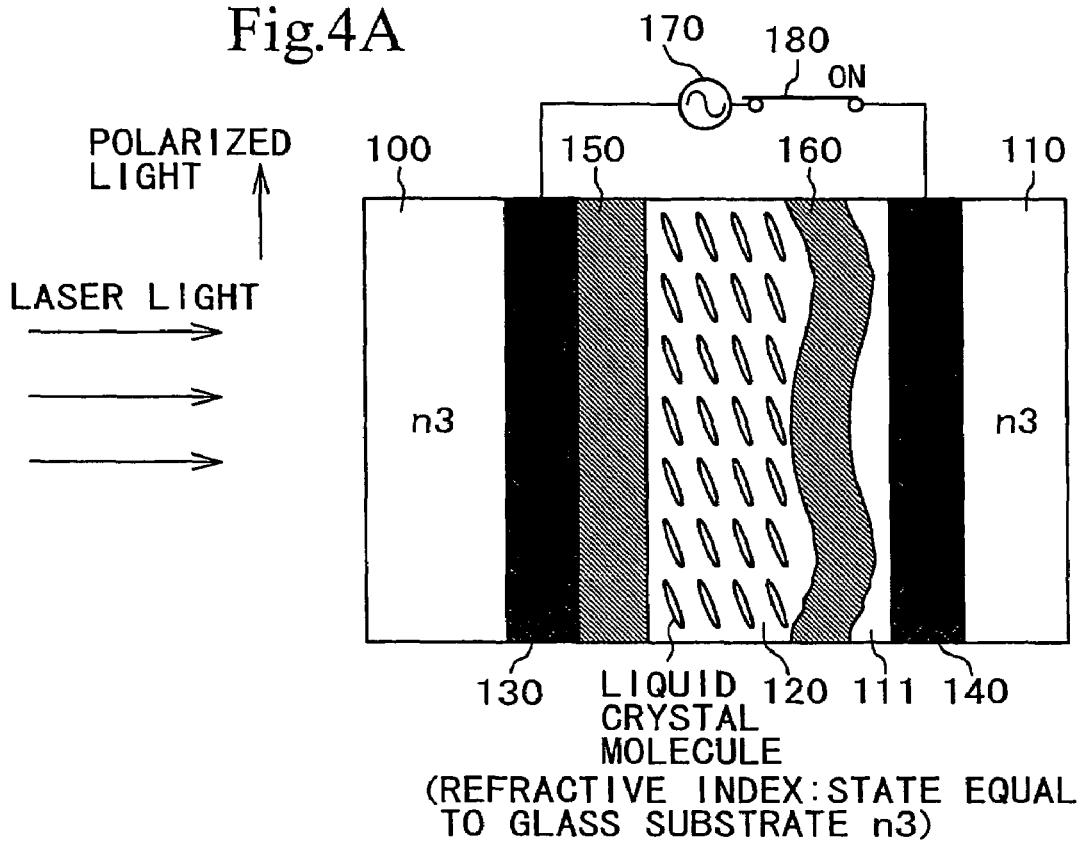
FIGS. 4A and 4B are cross-sectional views showing displacement of liquid crystal molecules in the liquid crystal device shown in FIGS. 3A and 3B.
Figure 4B:
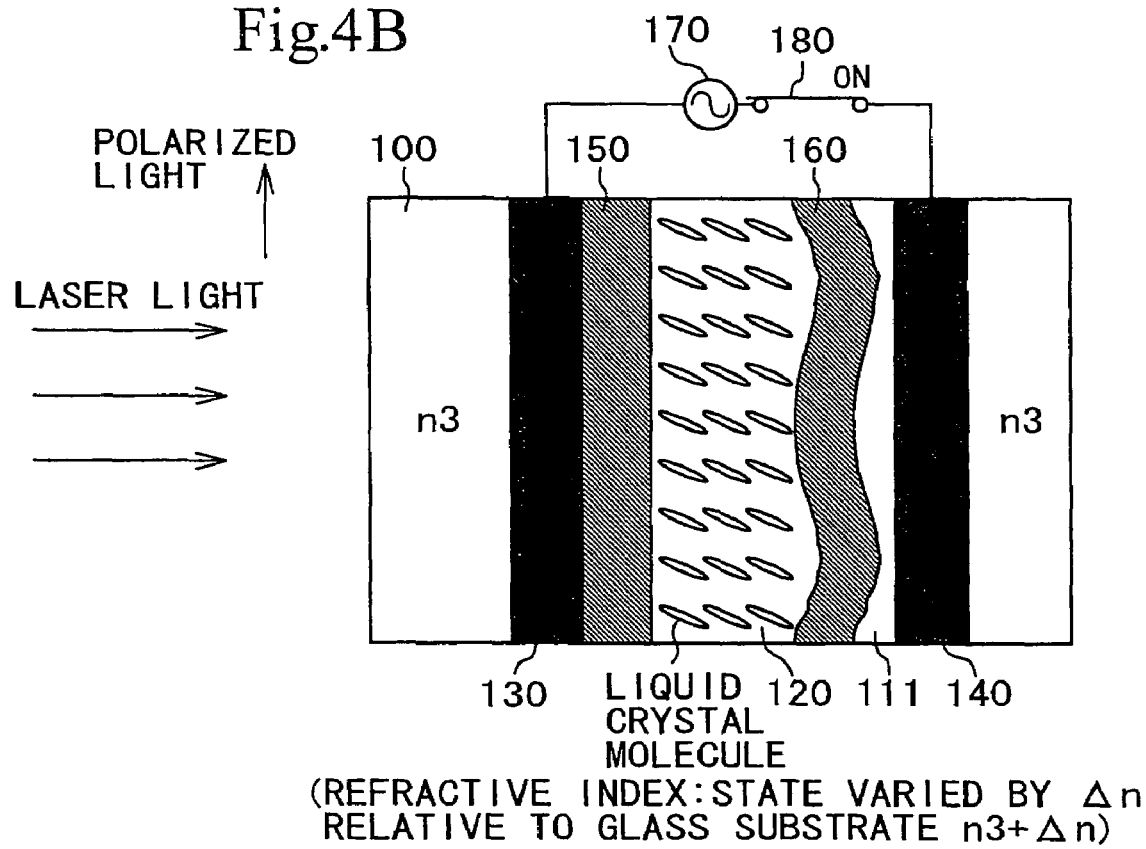

FIGS. 4A and 4B are cross-sectional views showing displacement of the liquid crystal molecules in the liquid crystal device according to the present embodiment.

First, if there is no need to give a phase distribution to transmitted light, namely, there are no manufacturing errors in an optical disc system or in an optical disc, and there are no aberrations in an image-forming plane, a predetermined voltage is applied across the electrodes of the liquid crystal device to maintain the same refractive index as the substrates (FIG. 4A).

Then, if a phase distribution is to be given, the voltage is varied to vary the refractive index of only a portion of the liquid crystal (FIG. 4B).

Since the phase distribution of the light being transmitted is determined by optical path length, the phase distribution is determined by the product of the thickness distribution d(x) of the liquid crystal layer and the refractive index difference Δn between the liquid crystal layer and the glass substrates. Accordingly, a phase distribution similar to the shape of the substrate surface can be given to the transmitted light.

The phase distribution desired to be given to the light being transmitted by the liquid crystal device may be made a distribution of opposite polarity to that of the phase distribution of a wavefront aberration of an image formed by the objective lens.

Consideration will be given hereinbelow to a case where it is desired to correct a thickness error dt and a skew θ of the optical disc. Incidentally, as to the thickness error in particular, the following description also applies to a case of two-layer discs even if an interlayer thickness is substituted for the thickness error in the description.

First of all, the thickness error dt produces a spherical aberration, and the skew produces a coma aberration. Their respective lower-order aberrations are given by the following equations, and their influences become larger for larger NA and shorter wavelengths:

for a third-order spherical aberration coefficient, $$W_{40} = dt/8 \times (n^2-1)/n^3 \times NA^4, \text{ and}$$

for a third-order coma coefficient, $$W_{31} = t/2 \times (n^2-1) \times n^2 \times \sin\theta \times \cos\theta/(n^2-\sin^2\theta)^{5/2} \times NA^3.$$

In these equations, t represents the thickness of the disk, dt represents the thickness error of the disc, n represents the refractive index of the disc, and θ represents the skew of the disc.

In addition, if these aberrations are expressed by coordinates (x, y) normalized to a pupil radius at a pupil plane of the objective lens,
for a third-order spherical aberration, $$W(x,y)=W_{40}(x^2+y^2)^2 \quad \text{(Equation 1)},$$

and
for a third-order coma aberration, $$W(x, y)=W_{31} \times (x^2+y^2) \quad \text{(Equation 2)}.$$

However, in a case of an objective lens having a larger NA, the phase distribution of aberration cannot be sufficiently accurately expressed by only its lower-order aberrations.

Accordingly, its higher-order aberrations are given by the following equations:
for a fifth-order spherical aberration coefficient, $$W_{60}=dt/48 \times (n^2-1) \times (n^2+3)/n^5 \times NA^6, \text{ and}$$

for a fifth-order coma coefficient, $$W_{51}=t/8 \times (n^2-1) \times n^2 \times \sin\theta \cos\theta/(n^2-\sin^2\theta)^{9/2} \times NA^5 \times (n^4+(3\cos^2\theta-5\sin^2\theta)n^2 \times 4\sin^2\theta - \sin^4\theta).$$

Then, if these aberrations are expressed by coordinates (x, y) normalized to the pupil radius at the pupil plane of the objective lens,
for a fifth-order spherical aberration, $$W(x, y)=W_{60}(x^2+y^2)^3, \text{ and}$$

for a fifth-order coma aberration, $$W(x, y)=W_{51} \times (x^2+y^2)^2.$$

However, since the higher-order aberrations merely have practically small influences on the vicinity of the spot center of focused light, their influences on the recording and reproduction of the optical disc are also small, so that the lower-order aberrations need only to be taken into account as aberrations to be corrected.

Figure 5A:
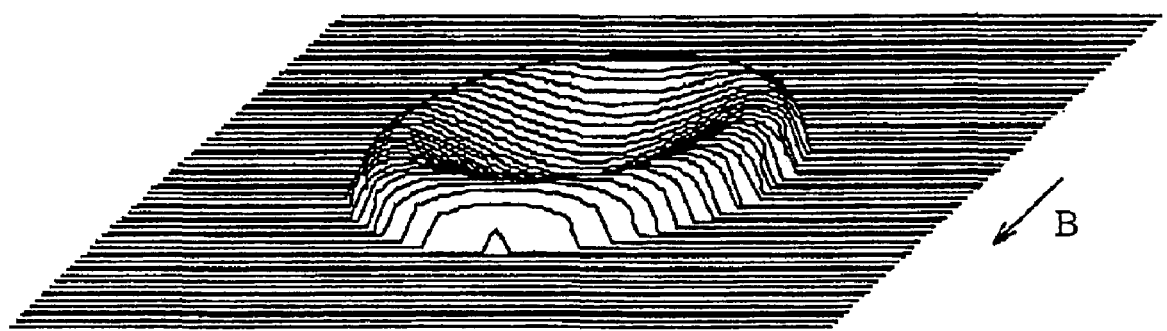
FIGS. 5A and 5B are perspective views showing wavefronts of a spherical aberration and a coma aberration.
Figure 5B:
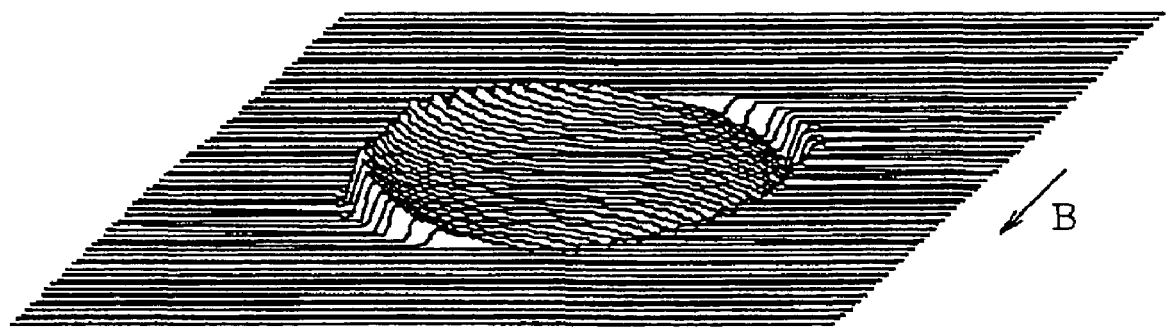

FIG. 5A and FIG. 5B are perspective views showing the wavefronts of the spherical aberration and the coma aberration. FIG. 5A shows the wavefront of the spherical aberration, and FIG. 5B shows the wavefront of the coma aberration.

If phase distributions of opposite polarity to these phase distributions are given previously to the transmitting wavefront of the liquid crystal device, no aberrations occur when an image is formed by the objective lens.

Accordingly, for spherical aberration correction, the shape of the liquid crystal device is made to have a shape similar to Equation 1 by means of a sub-substrate 111A having a cross-sectional shape corresponding to the wavefront shown in FIG. 5A, while for a coma aberration, the shape of the liquid crystal device is made to have a shape similar to Equation 2 by means of a sub-substrate 111B having a cross-sectional shape corresponding to the wavefront shown in FIG. 5B. The cross-sectional shapes of the respective substrates 111A and 111B shown in FIGS. 6A and 6B show shapes obtained when the wavefronts are viewed in the directions of arrows B shown in FIGS. 5A and 5B.

Then, in a case where a spherical aberration or a coma aberration actually exists and correction thereof is desired, a voltage may be applied to the liquid crystal to vary the refractive index of the liquid crystal by Δn, and the applied voltage may be controlled so that the product of the varied refractive index and the thickness d(x) assumes the opposite phase to the phase of the spherical aberration or the coma aberration.

In addition, even if the phase distributions of a spherical aberration and a coma aberration are not handled in themselves, these aberrations can be corrected. For example, even with a shape in which a spherical aberration is added to an aberration due to defocus, a focus servo can be made to correct the amount of defocus.

However, to adopt that shape is essentially meaningless, and if aberration correction is to be realized with a minimum applied voltage, it is only necessary to give a phase distribution which is equal in amplitude to and is opposite in polarity to the phase distribution of the aberration itself.

It is to be noted that the shape to which the aberration of defocus is added is likely to affect the focus servo because defocus occurs when the liquid crystal is driven. Likewise, it is not preferable to use a servo having a wide range relative to an aberration desired to be corrected, because the servo interferes with the focus servo and affects the stability of the servo.

According to the above-described embodiments, in a case where various perturbations such as a tilt of an optical disc from the optical axis in an optical pickup, a cover thickness error and an interlayer aberration of a two-layer disc are to be corrected by means of a liquid crystal device in which a liquid crystal layer has a thickness distribution, the shape of the liquid crystal layer can be made completely similar to the shape of a phase distribution desired to be corrected, and there is no need for complicated calculations of electric field strength distribution and the like.

In addition, aberration correction using this liquid crystal device can completely and accurately correct a phase distribution desired to be corrected.

A sub-substrate having an uneven portion which sandwiches the liquid crystal layer can be easily manufactured by the etching of a resin or a dielectric material.

Accordingly, the present device is suited to mass production and is easy to manufacture, whereby it is possible to promote yield improvement and cost reduction of the device.

It is to be noted that in the above-described example, the shape of one surface of two substrates which sandwich the liquid crystal layer of the liquid crystal device is made to be a shape similar to a desired phase distribution, but the present invention is not limited to this example and both surfaces also may be varied.

Namely, a phase distribution desired to be given to light being transmitted is determined by the product of the thickness distribution d(x) of the liquid crystal molecules sandwiched between the substrates and the refractive index difference Δn between the liquid crystal molecules and the glass substrates. Accordingly, the surface shape may be formed so that the thickness distribution becomes a phase distribution similar to the desired phase distribution.

As described hereinabove, according to the liquid crystal device and the manufacturing method therefor according to the present invention, an uneven portion for giving a distribution to the thickness of a liquid crystal layer is provided on an inside surface of substrates which sandwich the liquid crystal layer therebetween, and electrodes which apply a predetermined voltage to the liquid crystal layer are formed in planar shapes and are disposed in parallel with each other, whereby the electric field strength distribution becomes uniform and the thickness distribution of the liquid crystal layer can be accurately reflected in a phase distribution to be given to the wavefront of transmitted light.

Accordingly, it is possible to give the desired phase distribution to the transmitted light without the need for complicated calculations, so that it is possible to easily perform manufacturing of liquid crystal devices and device evaluations thereof.

In addition, according to the optical pickup of the present invention, it is possible to optimally control light being transmitted by disposing a liquid crystal device similar to the above-described one in the optical path, and the liquid crystal device can be easily optimized to correct various aberrations without the need for complicated calculations, whereby it is possible to greatly promote characteristic improvement of optical pickups and facilitation of the manufacturing thereof.

The invention claimed is:

1. A liquid crystal device characterized by including:
    a liquid crystal layer which controls a phase distribution of transmitted light;
    a pair of substrates which sandwich and seal said liquid crystal layer therebetween; and
    a pair of electrodes which are respectively disposed at inner sides of said substrates to apply a predetermined voltage to said liquid crystal layer, and characterized in that:
    an uneven portion for giving a distribution to a thickness of said liquid crystal layer is provided inwardly of said substrates, and
    said pair of electrodes are formed in planar shapes parallel to each other, wherein
    said uneven portion is an uneven shape, said uneven shape corresponding to a desired phase distribution; and
    said uneven shape of said uneven portion corresponds to the spherical aberration and the comma aberration of a wavefront.

2. A liquid crystal device according to claim 1, characterized in that said uneven portion is formed of a molded synthetic resin disposed between said liquid crystal layer and said electrodes.

3. A liquid crystal device according to claim 2, characterized in that said molded synthetic resin is made of an ultraviolet-curable resin.

4. A liquid crystal device according to claim 1, characterized in that said uneven portion is formed of a dielectric layer deposited on a liquid-crystal-side surface of said electrodes.

5. A liquid crystal device according to claim 1, characterized in that said uneven portion is provided on only one of said pair of substrates.

6. An optical pickup characterized by having an objective lens disposed to face a recording medium, a laser light source which supplies laser light to said objective lens, and a liquid crystal device which is disposed in an optical path leading from said laser light source to said objective lens and controls a phase distribution of transmitted light, and characterized in that:
    said liquid crystal device includes:
        a liquid crystal layer which controls the phase distribution of the light being transmitted;
        a pair of substrates which sandwich and seal said liquid crystal layer therebetween;
        a pair of electrodes which are respectively disposed at inner sides of said substrates to apply a predetermined voltage to said liquid crystal layer; and
        an uneven portion for giving a distribution to a thickness of said liquid crystal layer provided inwardly of said substrates, wherein
        said pair of electrodes are formed in planar shapes parallel to each other;
        said uneven portion is an uneven shape, said uneven shape corresponding to a desired phase distribution; and
        said uneven shape of said uneven portion corresponds to the spherical aberration and the comma aberration of a wavefront.

7. A manufacturing method for a liquid crystal device which includes:
    a liquid crystal layer which controls a phase distribution of transmitted light;
    a pair of substrates which sandwich and seal said liquid crystal layer therebetween; and
    a pair of electrodes which are respectively disposed at inner sides of said substrates to apply a predetermined voltage to said liquid crystal layer,
    said method characterized by comprising:
        a step of providing an uneven portion for giving a distribution to a thickness of said liquid crystal layer inwardly of said substrates; and
        a step of forming said pair of electrodes into planar shapes parallel to each other, wherein
        said uneven portion is formed in an uneven shape, said uneven shape corresponding to a desired phase distribution; and
        said uneven shape of said uneven portion corresponds to the spherical aberration and the comma aberration of a wavefront.

8. A manufacturing method for said liquid crystal device according to claim 7, characterized in that in said step of providing said uneven portion, a molded synthetic resin having said uneven portion is provided between said liquid crystal layer and said electrodes by a shape transfer method using a mold.

9. A manufacturing method for said liquid crystal device according to claim 8, characterized in that said molded synthetic resin is made of an ultraviolet-curable resin and is cured by irradiation with ultraviolet rays.

10. A manufacturing method for said liquid crystal device according to claim 7, characterized in that in said step of providing said uneven portion, a dielectric layer is provided on a liquid-crystal-side surface of said electrodes by patterning using a photomask.

* * * * *